Patented Dec. 29, 1936

2,065,675

UNITED STATES PATENT OFFICE 2,065,675

PROCESS OF MAKING FAT-CONTAINING POWDER

Elmer J. Fechner, Shelbyville, Ind., assignor to The Page Milk Company, Shelbyville, Ind., a corporation of Indiana No Drawing. Application August 1, 1932, Serial No. 627,219

7 Claims. (Cl. 99—118)

My invention relates to a new product which comprises broadly a milk powder containing a fat or oil; and to a process of making such product.

This new product has a wide usefulness, as for example in the baking art. It is a dry powder, and may readily be mixed with other dry ingredients. The fat contained in the dry powder may be a shortening fat, when the product is to be used in baking or as an ingredient in a prepared flour; or it may be some other edible fat, as when the product is to be used as an ingredient in special dietary foods. Perhaps its greatest usefulness is in the baking art, for here the fact that the shortening-containing powder is dry and readily mixed with other dry ingredients makes it possible to easily accomplish complete and thorough mixing of shortening and other ingredients and the complete dispersion of such shortening throughout the whole mix; a result heretofore not possible without the use of expensive and complicated machinery. It is thus possible to obtain substantially a perfect mixture between the shortening and the flour and other dry ingredients in the preparation of such products as bread, cake, pancakes, etc. In addition, the use of my product in prepared flours permits the ready and convenient inclusion in such prepared flours of the necessary shortening, and insures that in this sort of mixture also, the shortening will be thoroughly dispersed through the mixture.

When the fat included in the dry powder is a shortening fat, I call the product "dry shortening"; and while my invention is not limited to the use of a shortening fat, but may contain other fats, I shall refer herein to the product by the name of "dry shortening".

In the preparation of dry shortening, I mix a melted fat with hot liquid milk; homogenize the mixture; and then dry the homogenized mixture to a powder. The drying process removes the water originally contained in the milk, and the resulting dry powder includes within itself the shortening or other fat.

The milk used in the production of dry shortening may be whole milk, milk with part of its butter fat removed, or milk having an excess of cream; but preferably I use skim-milk, which contains about 10% of milk solids. By the word "milk" in this specification and the appended claims, I mean to include all these milk products.

The fat or oil used may be either of animal or vegetable origin, and may be a hydrogenated fat. The hydrogenated vegetable fats are preferable for their better keeping qualities, and I prefer to use a fat of this sort, as for example hydrogenated sesame oil or cotton seed oil. By the word "fats", I mean both fats and oils, including hydrogenated fats and oils.

In the process of preparing dry shortening, the milk and the fat are each first heated. The temperature to which they are heated may be merely sufficient to melt the fat, but desirably it is higher, or about 145° to 175° F.; for the higher temperature aids the subsequent homogenization. The maintenance of such temperature throughout the process not only facilitates it, but serves in addition to pasteurize the mixture. The two ingredients may be brought together before they are heated, but I prefer to heat them separately. When they are mixed, flavor such as butter flavoring may be added if desired; and the mixture is thoroughly stirred, while maintained at the temperature to which the ingredients were heated.

When the ingredients are thoroughly mixed, the hot mixture is homogenized, and desirably care is taken to maintain the high temperature of the mixture. In the homogenization, which may be accomplished by a standard homogenizer, the mixture is forced at very high pressures through exceedingly small openings. The pressure used for the homogenization will be generally in accordance with standard practice, and will be within the knowledge of a person skilled in the art. The necessary pressure may vary between 2,000 lbs. and 4,500 lbs. per square inch, and will be different for mixtures containing different percentages of fat, for the mixtures of higher fat content require higher pressures. The purpose of homogenization is to break up the fat into very small particles; for, generally speaking, the smaller such particles are, the better the results which will be obtained.

When the mixture has been homogenized, it is then dried to a powder. There are several suitable methods of drying, such as heated-roller drying either at atmospheric pressure or under vacuum, and spray-drying—, as by the Merrell-Soule process or the Gray-Jensen process. I prefer spray-drying, and have used the Gray-Jensen process. In such spray-drying system, the spray nozzle used is desirably approximately 0.056 inch in diameter. The desirable spraying pressure may vary considerably with local conditions, and must be determined by the operator. I have found suitable a pressure of about 4,000 lbs. per square inch. The air entering the drying unit should be heated to about 250° to 300° F., and desirably the supply of mixture should be maintained substantially at the temperature indicated as the desirable mixing temperature—of about 145° to 175° F.

The resulting powder should not be allowed to accumulate or become compacted while hot, nor should it be exposed to the high temperatures of the drying unit for any considerable length of time. Instead, the powder should be immediately cooled, as by being conveyed through a cooling tunnel or by being exposed to a current of cold air. It may then be sifted and is ready for use or for packaging.

The dry shortening made by this process contains fat and milk solids, and the percentage of fat may be varied as desired. I have made powders containing as high as 96% fat.

This dry-shortening is relatively heat-stable, so that it need not be refrigerated in order to preserve it, and ordinary temperatures do not release the fat. Indeed, the shortening will carbonize under heat before the fat is released. Its character is such that it keeps much better than the fat which it contains, usually for at least twice as long before it becomes rancid under the same conditions. These properties are apparently due to the structure of the particles of the finely comminuted shortening; for, generally speaking, the particles have a central core of fat, with a covering consisting of milk solids absorbed on that core of fat, each particle being very small on account of the fine sub-division which homogenization produces.

I give below two illustrative examples of the use of my process in making my new product. Both are based on records of actual operations, where the drying unit used operated in accordance with the Gray-Jensen process. Example I illustrates my process as applied to make dry-shortening containing 50% milk solids and 50% hydrogenated sesame oil; and Example II illustrates the process in making dry-shortening containing 20% milk solids and 80% hydrogenated cotton seed oil.

I. 50% fat—50% skim-milk solids 1,000 lbs. of skim-milk, heated to about 150° F., and 100 lbs. of hydrogenated sesame oil, heated to about 140° or 150° F., were mixed together and thoroughly stirred with an electric mixer (known commercially as a "Lightnin Mixer"), to get an even distribution of shortening throughout the mixture. The mixture was then homogenized at not less than 3,000 lbs. per square inch pressure, to get complete breaking down of the shortening into small evenly sized globules. The temperature of the mixture was maintained both before and after the homogenization at about 150° F., up to the time the mixture left the supply tank of the drier. The drying was by spraying in a Gray-Jensen drier, the incoming air being raised to a temperature of about 260° F., but varied to maintain an air temperature of between 185° and 190° F. at the bottom of the drying chamber, where the dry powder was drawn off. The spray nozzle used was a tapered nozzle with a diameter of .058 inch at its inner end and .056 inch at its discharge ends. The spraying pressure was about 4,000 lbs. per square inch. The dried powder withdrawn from the drier was promptly cooled; and after being sifted, was ready for packaging. It contained the 10%, or 100 lbs., of milk solids from the original milk, and the 100 lbs. of fat.

II. 80% fat—20% skim-milk solids 1,000 lbs. of skim-milk, heated to about 150° F., and 400 lbs. of hydrogenated cotton seed oil, heated to about 140° or 150° F., were mixed and stirred in the same manner as the ingredients of Example I; and the temperature of the mixture held at about 150° F. The mixture was homogenized with a pressure of 4,000 lbs. per square inch; then dried in the manner set forth in Example I. The resulting powder containing the 10%, or the 100 lbs., of solids from the original milk, and the 400 lbs. of fat, thus giving a mixture of 20% milk solids and 80% fat.

In its use in the baking art, my product is mixed with the other dry ingredients, and may supply all the necessary shortening as well as all or part of the milk solids desired. The shortening value of the original fat is all available in my dry-shortening, and when the fat content of the dry-shortening used is known, it is only necessary to calculate the quantity of dry shortening that contains the desired quantity of fat. Thus, the shortening value of one (1) pound of the original fat would be contained in one and a quarter (1¼) pounds of dry shortening containing 80% fat and 20% milk solids, or two (2) pounds of dry shortening containing 50% fat and 50% milk solids.

My dry shortening is not only of great advantage generally in the baking art, where the fact that it supplies shortening in dry form makes it possible to easily secure complete dispersion of the shortening throughout the dough mix; but it particularly valuable for use in prepared flours.

The prepared flours are offered in dry form to the ultimate consumer, for its use. It is very desirable that the prepared flour contain all the ingredients necessary except for water or milk, so that it is only necessary for such consumer to add water or milk before baking. Hitherto it has been difficult to include shortening in such prepared flours. With the use of my dry shortening, this difficulty is now removed. Thus prepared flours, complete except for water, might be compounded as set forth in the following illustrative examples.

III. White layer cake

A prepared flour suitable for making "white layer cake" contains:

| Ingredient | Parts by weight |
| --- | --- |
| Flour (soft winter) | 100 |
| Powdered sugar | 100 |
| Dry shortening (80% shortening fat—20% skim milk solids) | 44 |
| Powdered egg white | 5.5 |
| Soda | 1.5 |
| Pyro phosphate | 2.25 |
| Salt | 1.5 |
| Vanillin | .01 |

In the use of this prepared flour, two cups of the prepared flour are mixed well with ¾ cup of water or milk to get a soft, smooth batter; and the mix then baked at 375° for twenty-five (25) minutes.

IV. Biscuits

A prepared flour suitable for making biscuits contains:

| Ingredient | Parts by weight |
|---|---|
| Flour (blended soft and hard wheat) | 100 |
| Dry shortening (80% shortening fat—20% skim milk solids) | 20 |
| Dry skim milk | 4 |
| Soda | 1.5 |
| Pyro phosphate | 1.06 |
| Mono calcium phosphate | 1.18 |
| Salt | 1.0 |

In use, this prepared flour is mixed with milk or water in the proportions of two cups of flour to ⅔ cup of milk or water. The batter is rolled and folded, and baked twelve (12) minutes at 450° F.

In Example IV above the amount of dry shortening used, while sufficient to supply the shortening needs, is not sufficient to supply the milk-solid requirements, and additional milk powder is specified. Nevertheless, it is possible to make the dry shortening with any desired proportion between the fat and the milk solids, so that both the requirements for shortening and for milk solids may be supplied completely by a dry shortening, as is the case in Example III.

Thus, it will be apparent that my dry shortening has a wide usefulness in the baking art, and particularly in the compounding of prepared flours. However, the fat contained in the milk solids need not be a shortening fat. Instead, it may be some edible fat selected for its nutritive qualities, such for instance as cocoanut butter; and the resulting fat-containing powder may be used as an ingredient in special dietary or other foods.

I claim as my invention:

1. The process of producing a comminuted dry-shortening, which consists in preparing from milk and a hydrogenated vegetable oil solid at room temperature, a hot mixture having a temperature of about 145° to 175° F., homogenizing the mixture at that temperature to break up the fat into minute globules, drying the homogenized mixture by atomization into hot air to remove water and leave substantially dry milk solids adsorbed on the minute fat globules, and quickly removing the dried material from exposure to the hot air and cooling it without permitting such material to accumulate or become compacted while hot, the amount of such hydrogenated oil being sufficient to provide at least 50% fat in the final powder, all of said process steps following one another promptly.

2. The process of producing a comminuted dry shortening, which consists in heating to at least a pasteurizing temperature and mixing milk and a hydrogenated oil which is solid at room temperature but liquid at pasteurizing temperature, homogenizing the heated mixture to break up the fat into minute globules, quick-drying the hot homogenized mixture by atomization into hot air to remove water and leave substantially dry milk solids adsorbed on the minute fat globules, and then quickly cooling the dried material to a dry powder, the amount of such hydrogenated oil being sufficient to provide at least 50% fat in the final powder, all of said process steps following one another promptly.

3. The improvement in the process of making a dry comminuted shortening material which consists in adding to an edible oil, milk of normal moisture content and in an amount not enough to reduce the fat content below about 50 per cent of the total amount of non-aqueous material, but enough to effect proper emulsification, mixing the ingredients, heating the same to a pasteurizing temperature, emulsifying the mixture, during all of which preceding steps of the treatment the original moisture content is maintained, and then atomizing and quickly removing the moisture from said material to produce a shortening material in the form of a dry oleoferous powder containing at least about 50 per cent fat, the fat being in the form of minute globules each enclosed in an envelope of casein which has substantially the same chemical properties as the casein of normal milk but of improved film-forming properties, and which serves to protect the fat from deteriorative agencies while being readily soluble so that the fat is quickly released upon the addition of water to the material.

4. The improvement in the process of making a dry comminuted shortening material which consists in adding to an edible oil a milk of normal moisture content in an amount insufficient to reduce the fat content below about 50 per cent of the total quantity of non-aqueous material but sufficient to effect proper emulsification, heating the mixture to about a pasteurizing temperature, homogenizing the mixture, and then atomizing the same to produce a shortening material in the form of a dry oleoferous powder containing about 50 to 90 per cent fat, the fat being in the form of minute globules each enclosed in an envelope of casein which has substantially the same chemical properties as the casein of normal milk but has improved film-forming properties and which serves to protect the fat from deteriorative agencies while being readily soluble, so that the fat is quickly released upon the addition of water to the material.

5. The improvement in the process of making a dry comminuted shortening material which consists in adding to an edible oil a milk of normal moisture content in an amount insufficient to reduce the fat content below about 50 per cent of the total quantity of non-aqueous material but sufficient to effect proper emulsification, heating the mixture to about a pasteurizing temperature, homogenizing the mixture, and then atomizing the same to produce a shortening material in the form of a dry oleo-ferous powder containing about 50 to 90 per cent fat, the fat being in the form of minute globules each enclosed in an envelope of casein which has substantially the same chemical properties as the casein of normal milk but has improved film-forming properties and which serves to protect the fat from deteriorative agencies while being readily soluble, so that the fat is quickly released upon the addition of water to the material, said process being so conducted that the moisture content of the material is substantially maintained up to the drying operation.

6. The process of producing a comminuted dry shortening, which consists in preparing from milk and a shortening fat foreign to natural milk a hot mixture having a temperature of about 145° to 175° F., the fat content of said mixture being at least as great as the content of non-fatty solids and solids-forming material of the milk, homogenizing the mixture at that temperature to break up the fat into minute globules, quick-drying the homogenized mixture by atomization into hot air to remove water and leave substantially dry milk solids adsorbed on the minute fat globules, and quickly removing the dried material from exposure to the hot air and cooling it without permitting such material to accumulate or become compacted while hot, the said temperature of said materials being substantially maintained from before the homogenizing up to the drying operation.

7. The process of producing a comminuted heat-stable dry-shortening, which consists in preparing from skim-milk and a shortening fat foreign to natural milk a hot mixture having a temperature of about 145° to 175° F., said fat being present in such mixture in the proportion by weight of at least one part to ten parts of skim-milk, homogenizing the mixture to break up the fat into minute globules, quick-drying the homogenized mixture by atomization into hot air to remove water and leave substantially dry milk solids adsorbed on the minute fat globules, the said temperature of said materials being substantially maintained throughout the mixing, homogenizing, and drying operations, and then quickly cooling the dried material.

ELMER J. FECHNER.